United States Patent
Fields, Jr. et al.

(10) Patent No.: US 6,832,342 B2
(45) Date of Patent: Dec. 14, 2004

(54) METHOD AND APPARATUS FOR REDUCING HARDWARE SCAN DUMP DATA

(75) Inventors: James Stephen Fields, Jr., Austin, TX (US); Michael Youhour Lim, Leander, TX (US); Kevin F. Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 09/798,289

(22) Filed: Mar. 1, 2001

(65) Prior Publication Data

US 2002/0124210 A1 Sep. 5, 2002

(51) Int. Cl.[7] .............................................. G06F 11/00
(52) U.S. Cl. ........................................ 714/45; 714/48
(58) Field of Search .............................. 714/9, 10, 31, 714/37, 40, 45, 48, 57

(56) References Cited

U.S. PATENT DOCUMENTS

| | | | | |
|---|---|---|---|---|
| 5,237,677 A | * | 8/1993 | Hirosawa et al. ............. | 714/57 |
| 5,379,406 A | * | 1/1995 | Wade ........................... | 703/21 |
| 5,699,505 A | * | 12/1997 | Srinivasan ................... | 714/31 |
| 5,884,019 A | * | 3/1999 | Inaho ............................ | 714/6 |
| 5,974,565 A | * | 10/1999 | Okuhara et al. .............. | 714/11 |
| 6,105,150 A | * | 8/2000 | Noguchi et al. .............. | 714/44 |
| 6,182,243 B1 | * | 1/2001 | Berthe et al. ................. | 714/38 |
| 6,543,010 B1 | * | 4/2003 | Gaudet et al. ................ | 714/45 |
| 6,550,022 B1 | * | 4/2003 | Faver ........................... | 714/34 |
| 6,615,374 B1 | * | 9/2003 | Moran .......................... | 714/48 |
| 6,618,823 B1 | * | 9/2003 | West ............................ | 714/25 |

* cited by examiner

*Primary Examiner*—Robert Beausoliel
*Assistant Examiner*—Gabriel L Chu
(74) *Attorney, Agent, or Firm*—Duke W. Yee; Mark E. McBurney; Stephen J. Walder, Jr.

(57) ABSTRACT

A method, apparatus, and computer implemented instructions for processing an error in a multiprocessor data processing system. An error is detected within the data processing system. A chip, causing the error, is identified within a plurality of chips to form an identified chip. Data is collected from the identified chip and hardware associated with the identified chip.

12 Claims, 4 Drawing Sheets

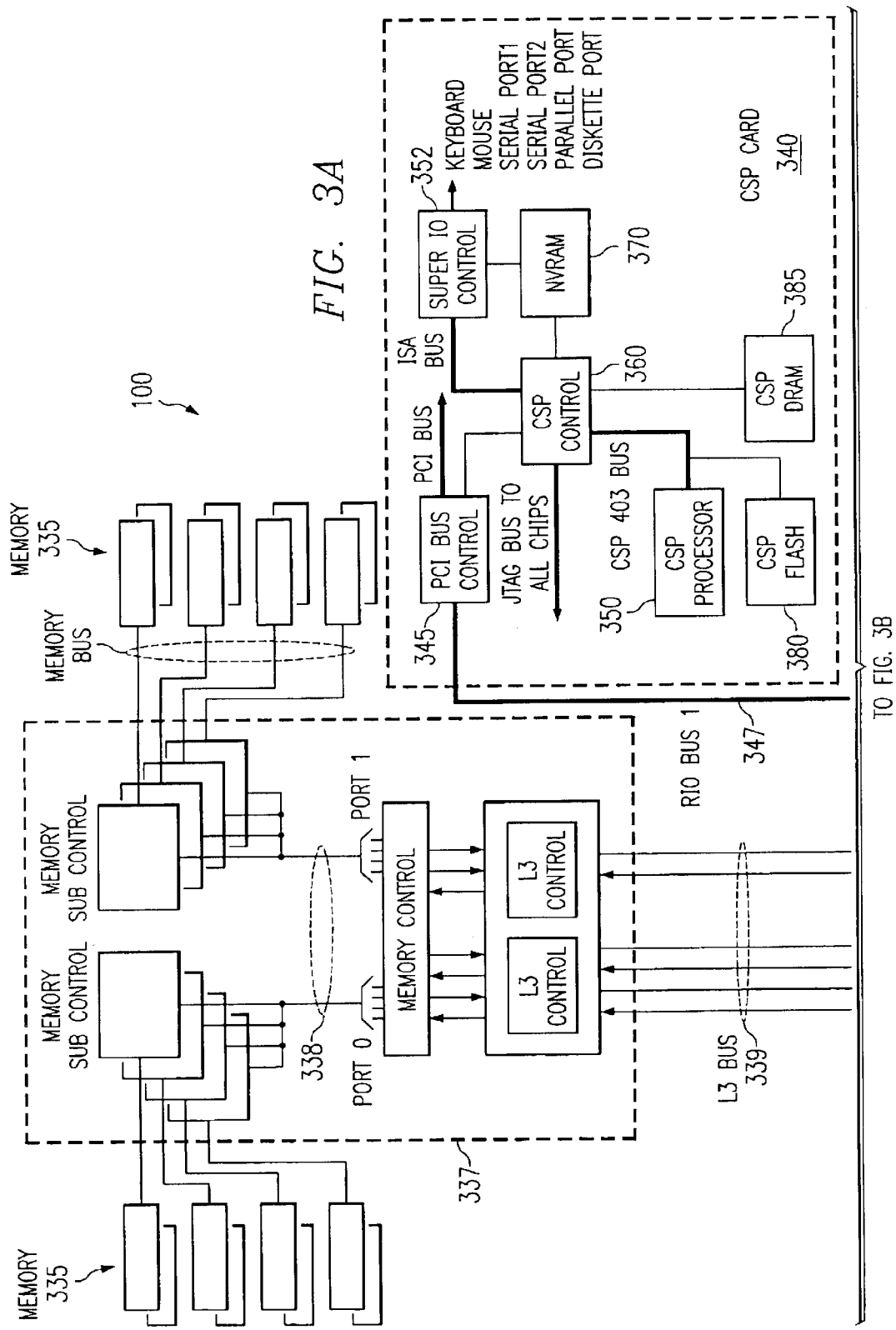

FIG. 4
| PROCESSOR: | GPR/FPR, SPR, I-CACHE AND D-CACHE DIRECTORY, SLB, TLB, D-ERATs AND I-ERATs, L2A, L2B AND L2C DIRECTORY |
|---|---|
| I/O CONTROLLERS: | RIO, GX, SGX, INTERRUPT AND TBASE SCAN RING |
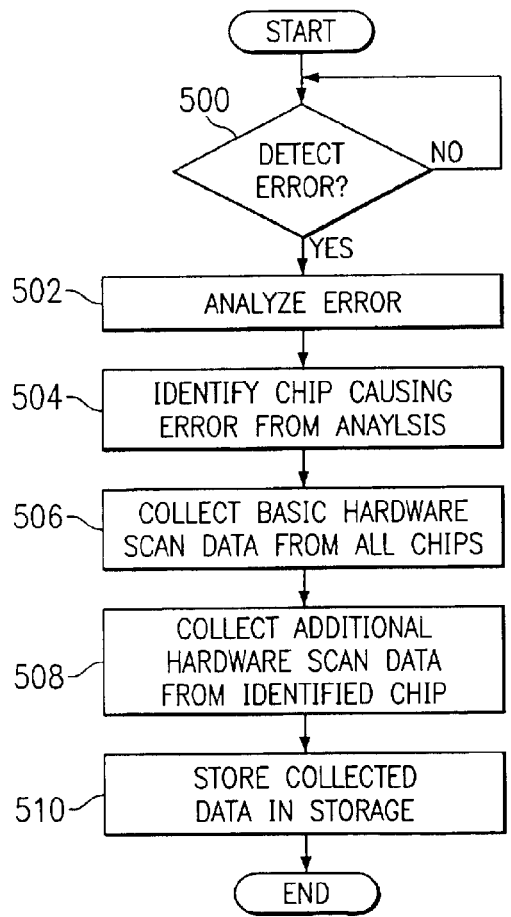
FIG. 5
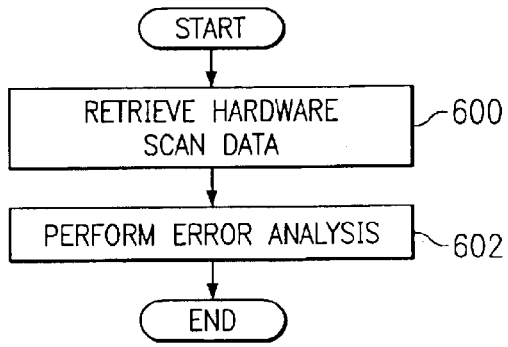
FIG. 6

METHOD AND APPARATUS FOR REDUCING HARDWARE SCAN DUMP DATA

BACKGROUND OF THE INVENTION

1. Technical Field

The present invention relates generally to an improved data processing system and in particular to a method and apparatus for managing data in a configurable data processing system. Still more particularly, the present invention provides a method and apparatus for reducing the amount of data collected for analyzing errors in a configurable data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

These partitions each have one or more processors associated with them. When an error, such as a system checkstop, occurs, a common service processor (CSP) function is employed to perform what is called a scan dump routine. When invoked, this routine collects data, such as, all possible scan rings, array data, and trace arrays. This data is stored in a nonvolatile random access memory (NVRAM) for later analysis. As systems become more complex, more data is needed for error analysis. As a result, room in the NVRAM is used up quickly. To gain more space, persistent storage, such as a hard drive, may be employed. Sometimes, even that space is insufficient. Another problem is the amount of time needed to collect the information increases.

Therefore, it would be advantageous to have improved method, apparatus, and computer implemented instructions for collecting data used in error analysis.

SUMMARY OF THE INVENTION

The present invention solves these problems by providing a method, apparatus, and computer implemented instructions for processing an error in a multiprocessor data processing system. An error is detected within the data processing system. A chip, causing the error, is identified within a plurality of chips to form an identified chip. Data is collected from the identified chip and hardware associated with the identified chip.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B is a block diagram form of a multiprocessor computer system in accordance with an embodiment of the present invention;

FIG. 4 is a table illustrating types of data that may be collected in response to an occurrence of an error in accordance with a preferred embodiment of the present invention;

FIG. 5 is a flowchart of a process used for reducing the amount of data collected in response to an error in a data processing system in accordance with a preferred embodiment of the present invention; and FIG. 6 is a flowchart of a process used for analyzing data in accordance with a preferred embodiment of the present invention.

DETAILED DESCRIPTION OF THE PREFERRED EMBODIMENT

Figure 1:
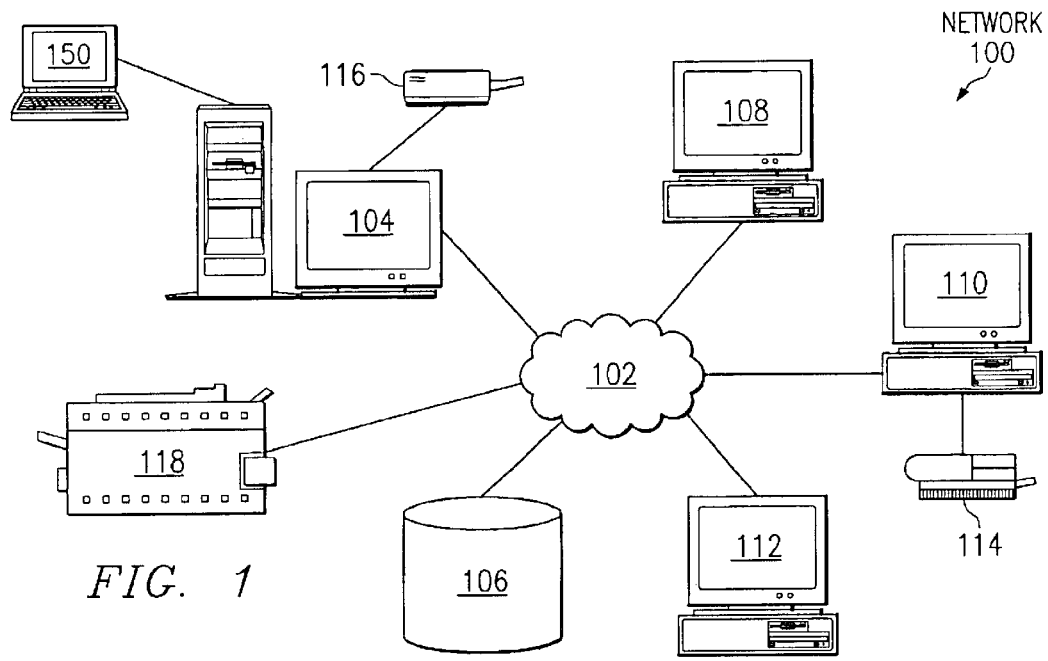
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network 102. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
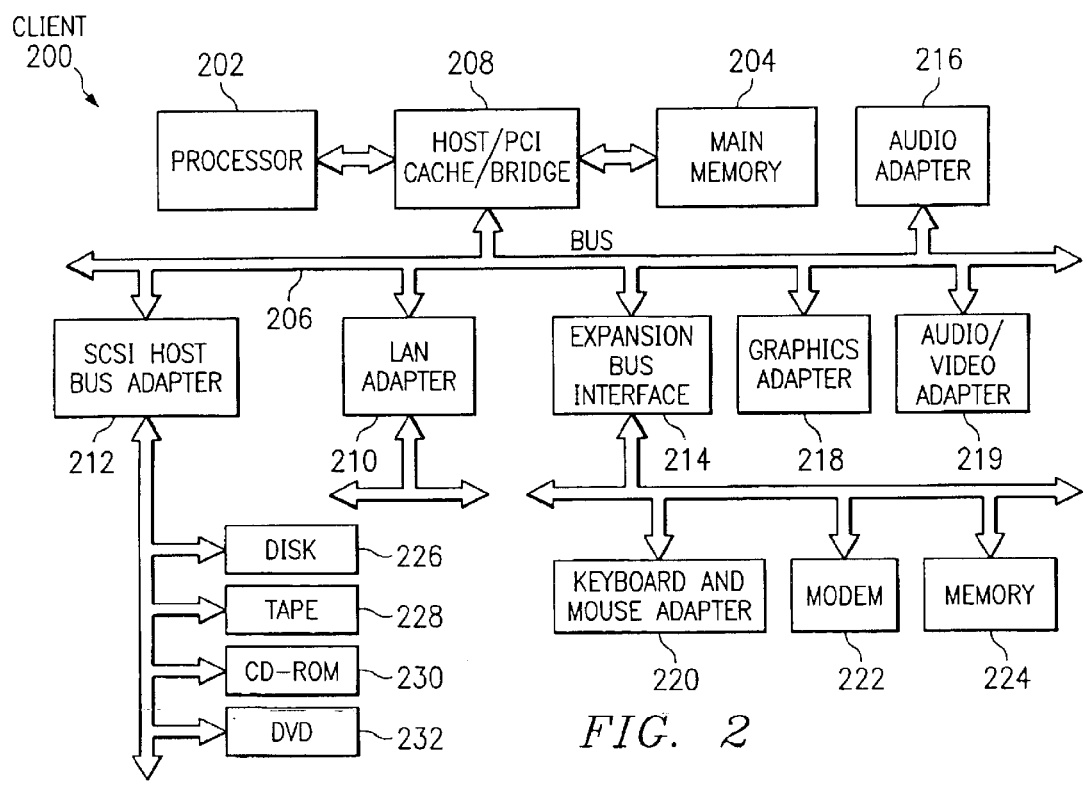
FIG. 2 is a block diagram of a data processing system in accordance with the present invention.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as AIX, which is available from International Business Machines Corporation. "AIX is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3B:
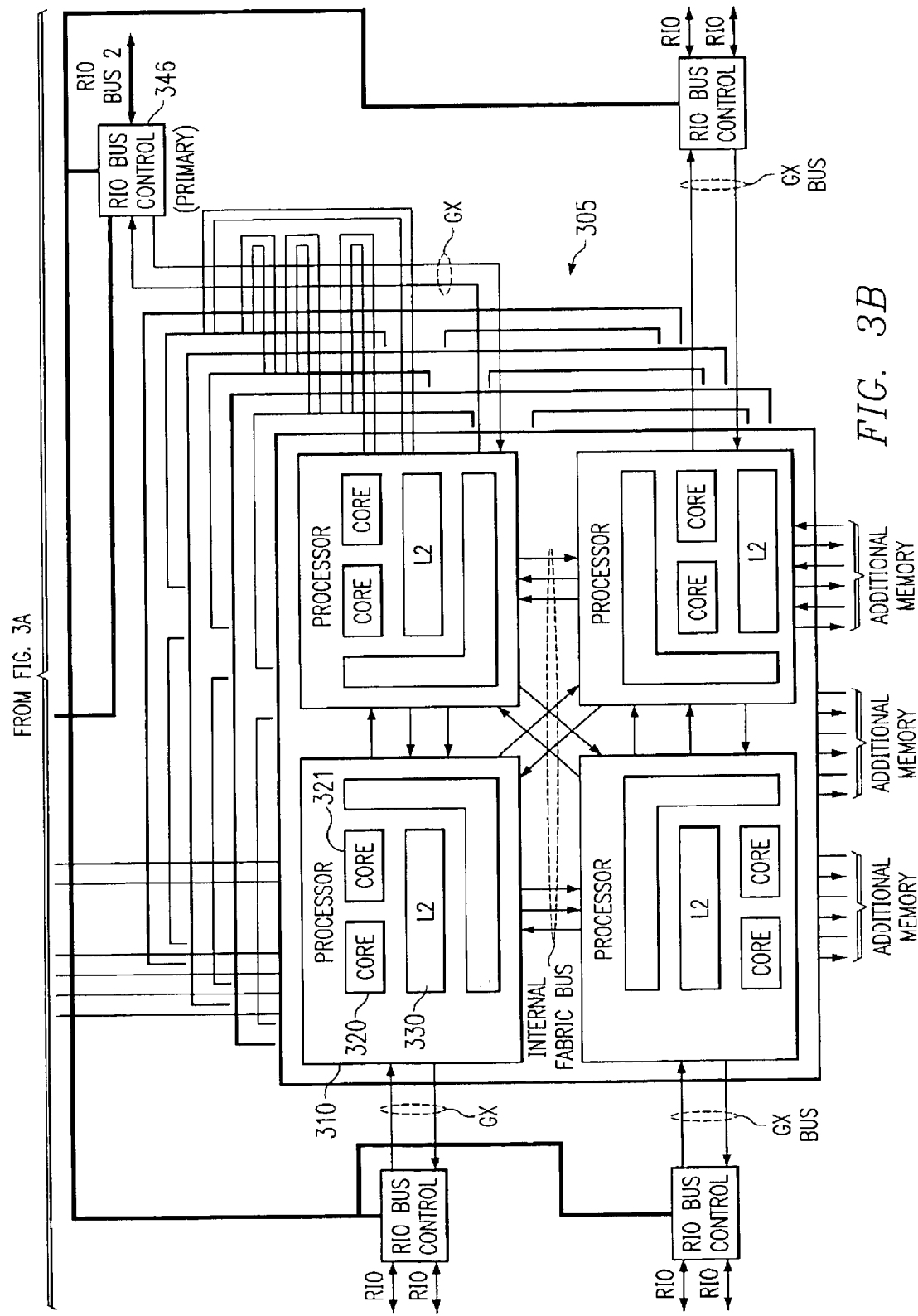

FIG. 3 provides a representation in block diagram form of a multiprocessor computer system 300 in accordance with an embodiment of the present invention. A processor array 305 is responsible for the bulk of computation within the multiprocessor computer system 300. Multiprocessor computer system 300 stores data in main memory 335 to be operated upon by processor array 305. Connecting processor array 305 with main memory 335 is a series of buses 338 and memory controllers 337 for directing the flow of information to and from different portions of main memory 335.

Processor array 305 contains a plurality of processor chips 310, each processor chip containing two processors 320 and a block of secondary cache memory (L2 memory) 330 shared by the processors.

Also present within multiprocessor computer system 300 is a common service processor (CSP) card 340, which fulfills a supervisory role within the system. CSP card 340 contains processor (the CSP) 350, non-volatile random-access memory 370, flash memory 380, dynamic random access memory (DRAM) 385, I/O interface 352 (for Keyboard, Mouse, two serial ports, a parallel port and a diskette port), and control logic 360 to link the components of CSP card 340 together. CSP 350 is responsible for analyzing errors that may occur within the system and executes error analysis software to perform that task. CSP card 340 is connected to the rest of multiprocessor computer system 300 through a bus 347 that is controlled through bus controllers 345, 346.

I/O controller 352 provides an interface for CSP 350 to communicate with peripherals and other devices.

The present invention provides a method, apparatus, and computer implemented instructions for reducing the amount of data collected in response to a detection of an error, but collecting sufficient data to analyze the error. This mechanism also reduces the amount of time needed to collect the data. In the event of an error, the common service processor (CSP) analyzes the system error to determine which chip or chip functional unit. Some chips contain more than one functional unit. Processor chip 330, for example, has two processor cores, an L2 (memory cache level 2), and common logic. After the analysis and identification of the chip on which the error has occurred, a call is made to a routine to collect data for analysis. A set of basic hardware scan data is collected from all of the chips in the system. Then additional hardware scan data is collected from the failing chip. More specifically, the data relating to hardware associated with the failing chip is collected. The mechanism of the present invention in essence provides a filter to allow the appropriate data associated with the failure to be analyzed without requiring additional storage. Further, if needed, additional data relating to other chips in the system may be subsequently scanned and retrieved.

The hardware scan data is the register bit setting inside the chip. A collection of registers forms a scan ring. Each chip has multiple scan rings. The scan ring can be accessed only through JTAG bus, IEEE Std 1149 serial bus which contains Test Mode Select (TMS), Test Clock (TCK), Test Data In (TDI) and Test Data Out (TDO). This data is then stored for later analysis.

Thus, through collecting a first amount of data from all of the processors and a second set of data from the processor or processors identified as causing the error, the amount of data collected is reduced. The data associated with the error within a chip or chip functional unit can be analyzed without the data for other chips or chip functional units.

Turning next to FIG. 4, a table illustrating types of data that may be collected in response to an occurrence of an error is depicted in accordance with a preferred embodiment of the present invention. With a system containing multiple processors, multiple memory controllers, and multiple I/O controllers, table 400 illustrates possible scan ring, array data, and trace arrays that may be collected for each chip. The following are descriptions of some types of data that may be collected in table 400:

Processor:
GPR: General Purpose Register. This register is use for system specific.
FPR: Floating Point Register. This register is used to control the floating point.
SPR: Special Purpose Register.
I-Cache: Level 1 Instruction Cache.
D-Cache: Level 1 Data Cache.
SLB: Segment Look-aside Buffer.
TLB: Tag Look-aside Buffer. This buffer contains a list of command tag.
D-ERAT: Data Effective Real Address Table. This contains a list of read address for Data. In another word, this is the real address mapping for Data.
I-ERAT: Instruction Effective Real Address Table. This contains a list of real address for instruction. In another word, this is the real address mapping for instruction.
L2A, L2B, L2C: Level 2 Instruction/Data Cache directories. I/O Controller:
RIO: Remote Input/Output Interface. This contains data about the interface to the remote I/O system that connects to this bus. The remote I/O system is a system that provide interfaces for many PCI adapters such as storage adapter, network adapter, console adapter, and etc.
GX: System bus. This contains data about system bus between processor and I/O controller.
SGX: Slow System Bus. This contains data about the slow system bus between processor and I/O controller.
Interrupt Scan Ring: This scan ring contains information about interrupt.
TBASE Scan Ring: Time Base Scan Rings. This scan ring contains information about system and Remote I/O bus timing.

During operation, if the CSP detects an error condition, an assumption may be made that the error was caused by an address conflict on the I/O bus. In this example, an I/O controller pulls a "checkstop". A system is in a checkstop condition when hardware detects some kind of error which causes system to hung or inoperable. When the CSP performs an error analysis, it detects that this I/O controller is the failing chip in the system. The CSP calls a scan dump routine, with information about the I/O controller, to save hardware scan data. In these examples, the scan dump routine contains the processes of the present invention. This routine is executed by the CSP in these examples. The information collected in this example is as follows: all processors—GPR/FPR, SPR, I-Cache and D-Cache Directory, SLB, TLB, D-ERATs and I-ERATs ; and all I/O controllers—RIO, GX, SGX, Interrupt and TBASE scan ring. L2A, L2B, and L2C directories are not required because they are not used to isolate the I/O area.

If the error is caused by a processor (assuming control error), that processor will pull the checkstop. When the CSP performs an error analysis, it will detect this processor as the failing chip or chip functional unit. The CSP will then call the scan dump routine, using identification information for the processor, to save hardware scan information. This process will collect the following data: failing processor—GPR/FPR, SPR, I-Cache and D-Cache Directory, SLB, TLB, D-ERATs, I-ERATs, L2A directory, L2B directory, and L2C directory; other processors—GPR/FPR, SPR, I-Cache and D-Cache Directory, SLB, TLB, D-ERATs and I-ERATS; and all I/O controllers—RIO, GX, SGX, Interrupt and TBASE scan ring. The L2A, L2B, and L2C directories are collected for the processor because they can be used to analyze control errors for this processor. These directories are not collected for the other processors because they cannot be used to analyze the control error in the failing processor. A control error occurs when the internal control logic for the chip is in an invalid state. The data collected is presented for purposes of illustration only. Other types of data may be collected in addition to or in place of the data described above, depending on the particular implementation. For example, data from memory controllers may also be collected.

In any case, all of the hardware scan data for all of the processor are never collected. This mechanism saves storage space and time.

Turning next to FIG. 5, a flowchart of a process used for reducing the amount of data collected in response to an error in a data processing system is depicted in accordance with a preferred embodiment of the present invention. The process illustrated in FIG. 5 may be implemented in the form of computer instructions and executed by a processor, such as CSP processor 350 in FIG. 3.

The process begins with a determination as to whether an error has been detected (step 500). When hardware error occurs, hardware sends attention interrupt to CSP controller 360 in FIG. 3. CSP 350 analyzes the interrupt to determine which subsystem sent this interrupt. Once knowing which subsystem causes the interrupt, CSP 350 reads the status registers of each chip to determine which chip or chip functional unit has caused the interrupt to raise attention and the attention type to report. These attention types can be checkstop, recoverable, or special attention. A special attention is raised when some kind of test is complete, for example, Build In Self Test and Memory Test. In the case of checkstop and recoverable attention, CSP 350 translates these attention types as error conditions.

If an error is detected, the error is analyzed (step 502). The analysis then determines the identity of the chip or chip functional unit causing the error (step 504). The identification of the chip or chip functional unit is made in these examples by identifying the chip or chip functional unit that pulls the checkstop.

Next, the basic hardware scan data is collected from all hardware associated with the identified chip causing the error (step 506). Additional hardware scan data is collected from the identified chip causing the error (step 508). Steps 506 and 508 illustrate the collection of data from the failing chip as well as data from hardware associated with the failing chip for use in error analysis. The data collected also may be filtered of selected based on the error type. The collected data is then stored in storage (step 510) with the process terminating thereafter. Steps 506–510 may be implemented within a scan dump routine called by the service processor.

With reference again to step 500, if no error is detected the process returns to the beginning of step 500 as described above.

Turning now to FIG. 6, a flowchart of a process used for analyzing data is depicted in accordance with a preferred embodiment of the present invention. The process illustrated in FIG. 6 may be implemented in the form of computer instructions and executed by a processor, such as CSP processor 350 in FIG. 3.

The process begins by retrieving hardware scan data (step 600). Next, an error analysis is performed (step 602) with the process terminating thereafter. In these examples, the error analysis of this type is performed manually. A customer engineer retrieves the hardware scan data by diskette, network, or CDROM and sends this data to the chip owner to determine the failure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing an error in a multiprocessor data processing system, the method comprising:

detecting the error;

identifying a processor within the plurality of processors causing the error to form an identified processor;

collecting a first amount of data from the plurality of processors;

collecting additional data from the identified processor; and wherein the first amount of data includes cache data, general purpose registers data, floating point registers data, directory information data, trace arrays data, and scan rings data.

2. The method of claim 1, wherein the identifying step includes:

analyzing the error to identify the processor.

3. The method of claim 1 further comprising:

storing the first amount of data and the additional data in a nonvolatile memory.

4. The method of claim 3, wherein the nonvolatile memory is a nonvolatile random access memory.

5. A data processing system for processing an error in a multiprocessor data processing system, the data processing system comprising:

detecting means for detecting the error;

identifying means for identifying a processor within the plurality of processors causing the error to form an identified processor;

first collecting means for collecting a first amount of data from the plurality of processors;

second collecting means for collecting additional data from the identified processor; and wherein the first amount of data includes cache data, general purpose registers data, floating point registers data, directory information data, trace arrays data, and scan rings data.

6. The data processing system of claim 5, wherein the identifying step includes:

analyzing means for analyzing the error to identify the processor.

7. The data processing system of claim 5 further comprising:

storing means for storing the first amount of data and the additional data in a nonvolatile memory.

8. The data processing system of claim 7, wherein the nonvolatile memory is a nonvolatile random access memory.

9. A computer program product in a computer readable medium for processing an error in a multiprocessor data processing system, the computer program product comprising:

first instructions for detecting the error;

second instructions for identifying a processor within the plurality of processors causing the error to form an identified processor;

third instructions for collecting a first amount of data from the plurality of processors;

fourth instructions for collecting additional data from the identified processor; and wherein the first amount of data includes cache data, general purpose registers data, floating point registers data, directory information data, trace arrays data, and scan rings data.

10. The computer program product of claim 9, wherein the identifying step includes:

instructions for analyzing the error to identify the processor.

11. The computer program product of claim 9 further comprising:

instructions for storing the first amount of data and the additional data in a nonvolatile memory.

12. The computer program product of claim 11, wherein the nonvolatile memory is a nonvolatile random access memory.

* * * * *